UNITED STATES PATENT OFFICE.

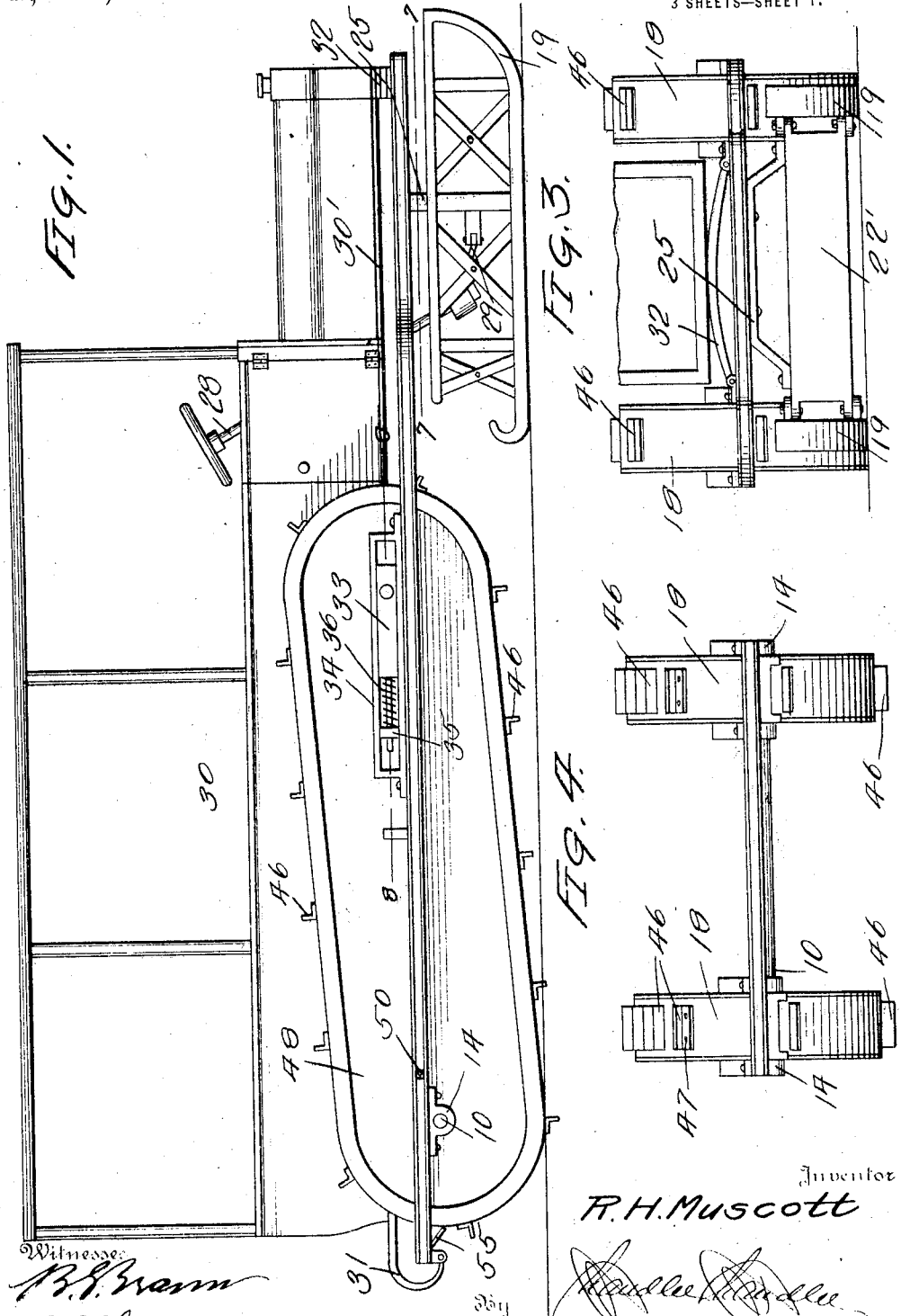

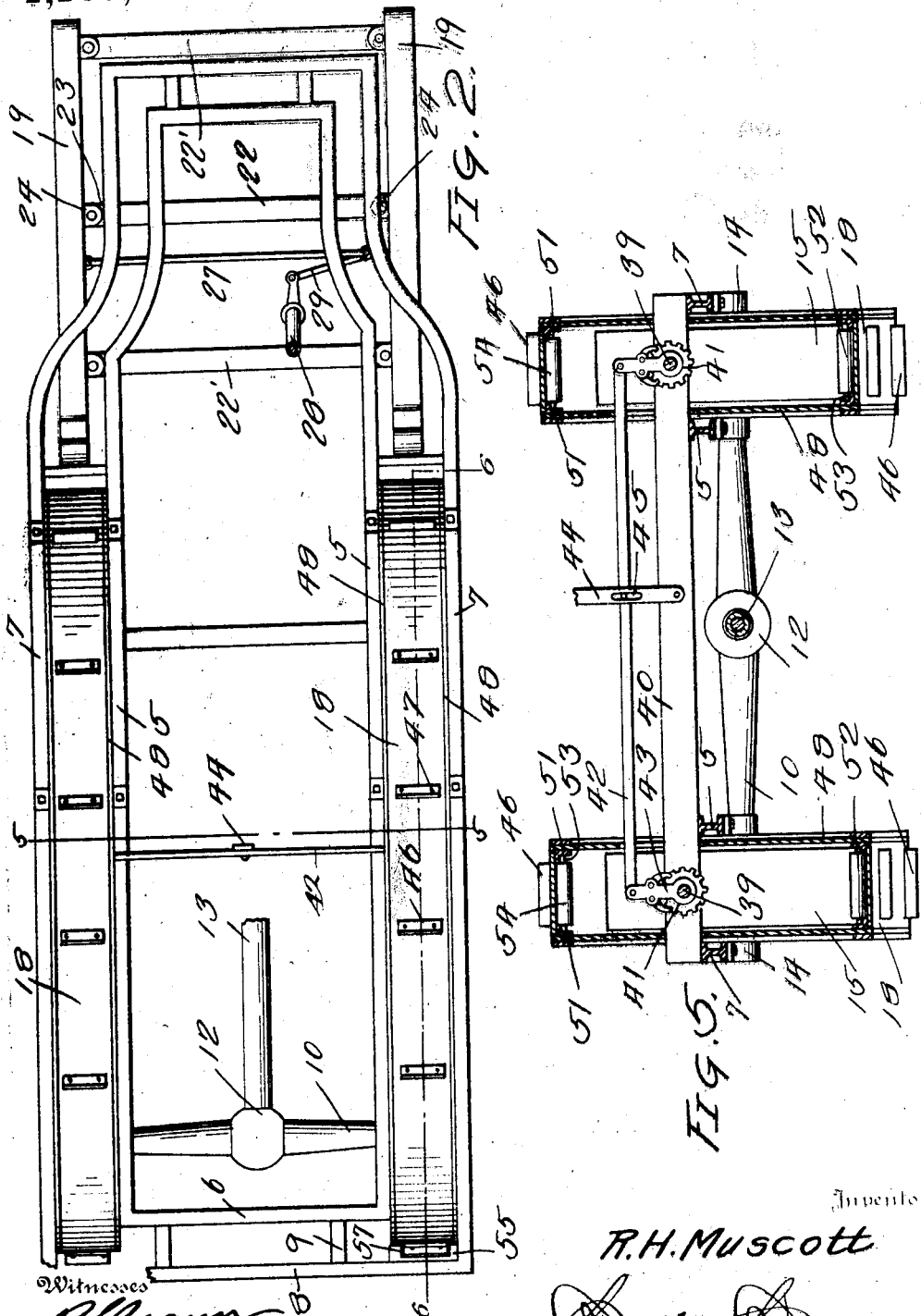

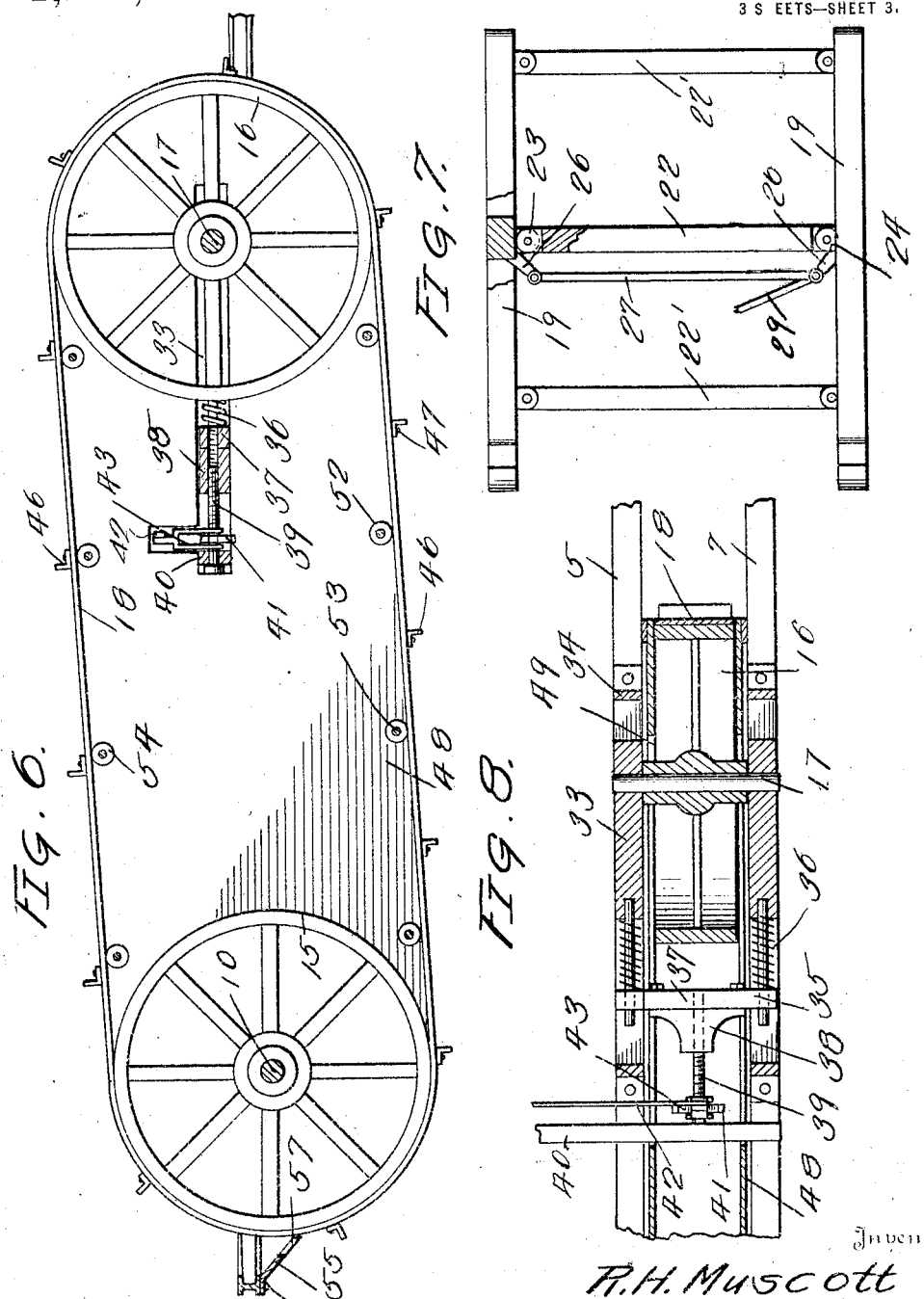

RAY H. MUSCOTT, OF WATERS, MICHIGAN.

MOTOR-SLEIGH.

1,188,981.   Specification of Letters Patent.   Patented June 27, 1916.

Application filed July 13, 1915. Serial No. 39,660.

*To all whom it may concern:*

Be it known that I, RAY H. MUSCOTT, a citizen of the United States, residing at Waters, in the county of Otsego, State of Michigan, have invented certain new and useful Improvements in Motor-Sleighs; and I do hereby declare the following to be a full, clear, and exact description of the invention, such as will enable others skilled in the art to which it appertains to make and use the same.

This invention relates to new and useful improvements in vehicles supported on runner bases and self-propelled, and is particularly directed to such of that type which are driven by the engagement of a belt tread on the ground.

It is the object in general of this present invention to simplify and improve the structures of vehicles of this character, and it is more specifically the object to provide novel means for supporting the tread drive belts of the vehicle in such manner that the driving mechanism therefor is so housed as to be protected against snow or other matter having a tendency to clog such mechanism and further whereby the belt may be held under proper tension.

It is further an object to provide such means for holding the belt under tension which may be readily operated from within the body of the vehicle to adjust the tension means to compensate for the expansion and contraction of the belt incident to changes in temperature.

It is still further an object to provide such a frame structure for the vehicle whereby the strain incident to the actuation thereof and the strain incident to adjusting and holding the tread belt under proper tension is properly distributed.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a side elevation of an automobile sleigh constructed in accordance with the present invention. Fig. 2 is a top plan view of the vehicle, with the body thereof removed to more clearly show the chassis structure. Fig. 3 is a front elevation of the improved vehicle. Fig. 4 is a rear elevation thereof. Fig. 5 is a transverse sectional view through the structure on the line 5—5 of Fig. 2. Fig. 6 is a longitudinal sectional view taken through one of the drive belt structures on the line 6—6 of Fig. 2. Fig. 7 is a transverse sectional view taken through the front truck portion of the vehicle on the line 7—7 of Fig. 1. Fig. 8 is a detail sectional view on the line 8—8 of Fig. 1.

Referring now more particularly to the accompanying drawings a double main frame is provided which comprises the inner side sills 5 and end sills 6 and the outer side sills 7 and end sills 8 and these two frames are connected at various points by connecting bars 9. This structure is resorted to so as to eliminate the tendency to twisting strain which would be exerted by the drive belts hereinafter to be described were only a single frame used, due to the tension necessary for the proper mounting of the belt, each of the belts being disposed between a respective pair of side sills.

The vehicle is provided with a rear axle 10 similar to the rear axle of an automobile and carrying a differential 12 from which extends a drive shaft 13 which is connected to a suitable engine carried by the frame, such engine being not shown but preferably mounted in a general manner as in an automobile. This rear axle is journaled in bearings 14 depending from the side sills 5 and 7, and belt drive wheels 15 are carried thereon between the side sills and coact with belt drive wheels 16 carried by a forward idle shaft 17 to be hereinafter described, to support the drive belts 18 which carry the rear of the machine.

The forward portion of the machine is carried on a truck including the runners 19, each of these runners preferably comprising a relatively wide surface for use on snow. The forward portion of the frame, and the runners are connected centrally by a bar 22 having at its ends lugs 23 pivoted to vertically spaced pairs of lugs 24 on the runners. The front and rears of the runners are connected by pivoted bars 22'. The forward end of the frame is supported on the bar 22 by a member 25 of inverted U-shape. The truck is steered by arms 26 extending diagonally inwardly from the runners adjacent the bar 22 and connected by a steering rod 27. A steering shaft 28 is carried by the body of the vehicle and connected to one of the arms 26 by a link 29 as in ordinary automobile construction.

The body 30 of the vehicle may be of any desired type. In the drawings it is shown as in the form of a bus, carried on a frame 30' and it is resiliently supported on the main frame by springs 31 at its rear portion which are secured to the rear axle structure 10 and by springs 32 at its forward end secured to the forward end of the main frame.

Taking up now in detail the tension mounting of the front axle of the belt drive, the said axle is carried by blocks 33 which are slidably held in boxings 34 which are mounted on top of the side sills of the frame. Slidably held in the boxings rearwardly of the blocks 33 are blocks 35, and expansile springs 36 are secured between the respective blocks. For holding the blocks 35, and for moving them as desired to compensate for the expansion and contraction of the belt due to temperature changes, bars 37 connect the blocks 35 of each respective pair of sills and each of these bars carries a rearwardly extending socket member 38 in which is threadedly engaged a feed screw 39 having its rear end swively carried by a bar 40 connecting the sills. For rotating these screws to increase or relieve the tension on the front axle 17, each of them carries at its rear end a double ratchet wheel 41. Straddling the ratchets 41 and pivotally mounted on the feed screws 39 are bifurcated levers 43 having secured thereto pivoted pawls which are arranged for rotating the ratchets when the levers 43 are oscillated. Suitable conventional means are provided for lifting respective pairs of pawls. Connected to the upper end of the levers 43 for the oscillation of the same, is a bar 42 which is arranged to reciprocate transversely of the frame. This bar is actuated by a lever 44 pivotally carried by the body and extending thereinto so as to be readily manipulated, and having preferably a slidable pivotal connection with the bar at 45 so that when the lever is rocked the screws may be rotated to advance or retract the blocks 35. It will be understood that this adjusting means applies to expansion and contraction due to relatively great changes in temperature and to possible adjustment due to the provision of new belting, while the springs 36 compensate for the minor changes and holds the belts under proper tension. Each of the belts 18 preferably comprises an endless steel band, and to facilitate its gripping action it is provided with transverse ribs 46 which are preferably formed of angle plates having certain of their sides bolted at 47 to the belt.

For housing the drive structure, so that snow or other obstructions will not interfere with the proper operation thereof, shield plates 48 oblong in shape are secured at the sides of the belts and between them and the frame shaft, and these plates are secured by passing the axles through openings 49 therein and further by bolting them as at 50 to their adjacent sills. The peripheral edge of each of these plates substantially coincides with the outer surfaces of the belt, and to provide a guide means for the belt which at the same time reinforces the edge portions of the shield plates, angle beams 51 are secured to said edge portions and have their outer sides extending together to form substantially a shelving supporting the belt. For further supporting the belt adjacent where it engages the ground, rollers 52 are provided having pintles 53 journally passed through the angle beams and the edge portions of the plates, and similar rollers 54 are provided for supporting the upper portions of the belt.

It is noted that the bearings for the rear axle 10 are disposed below the sills and that the bearings for the front shaft 17 are carried on the sills, and as the wheels are of substantially the same diameter which carry the belts the tread portions of the belts therefore incline upwardly toward the front of the vehicle. By this arrangement, when the vehicle is traveling over ice or over a relatively hard surface, only that portion of the belt which is adjacent the rear drive wheels 15 engages the ground, and when the vehicle travels over snow or a softer surface, the belt will engage in accordance with the yielding character of said surface. A scraper plate 55 is provided for the belts and is secured at 56 to the rear sill 8 and extends forwardly and downwardly to engage the belts, the intermediate portion of the engaging edge of this plate being cut away at 57 to receive the belt ribs 47.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:

1. A motor sleigh comprising a main frame formed of an outer section including side and end sills, an inner section including side and end sills spaced within said first sills, members connecting the sills of the respective sections, shafts journaled to extend transversely of said sections at their rear portions, wheels on said shafts disposed between the adjacent side sills of the frame sections, tread bands trained around respective pairs of wheels and means for holding said tread bands under tension, means for supporting the front of the frame, and means for driving said tread bands.

2. In a motor sleigh, the combination with a main frame including pairs of side sills, of belt wheels journaled to lie between each pair of side sills, tread belts trained around said wheels, shield plates disposed between the wheels and the sills, each plate extending between a respective pair of wheels and of substantially the outline of the tread belt and said plates being secured to their adjacent sills.

3. In a motor sleigh, the combination with a main frame including pairs of side sills, of belt wheels journaled to lie between each pair of side sills, tread belts trained around said wheels, shield plates disposed at the sides of the wheels and belts and secured to the adjacent sills, each plate extending between a respective pair of wheels and of substantially the outline of the tread belts, inwardly extending flanges carried by said plates to guide the belts, and rollers carried by said plates for supporting said belts.

In testimony whereof, I affix my signature, in the presence of two witnesses.

RAY H. MUSCOTT.

Witnesses:
W. A. D. HALL,
ARCHIE B. WILLIAMS.